Figure 9:
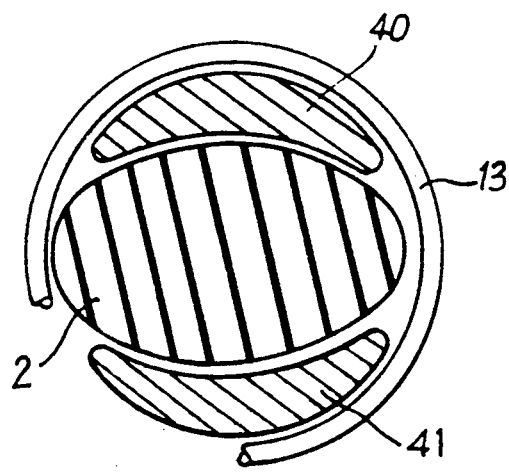

United States Patent [19]

Sciard

[11] Patent Number: 5,099,959
[45] Date of Patent: Mar. 31, 1992

[54] DEVICE FOR BRAKING THE UNWINDING OF AN ELONGATE ELEMENT SUCH AS A HOSE OR CABLE

[75] Inventor: Alain H. J. Sciard, Paris, France

[73] Assignee: Coflexip, Paris, France

[21] Appl. No.: 259,409

[22] Filed: Oct. 17, 1988

Related U.S. Application Data

[63] Continuation of Ser. No. 939,161, Jan. 20, 1987, abandoned.

[30] Foreign Application Priority Data

Mar. 18, 1985 [FR] France .................. 85 03951

[51] Int. Cl.⁵ .............. B66D 5/16; F16D 49/04; F16L 1/04
[52] U.S. Cl. ................................... 188/65.1
[58] Field of Search .............. 188/65.1–65.5; 114/199, 200; 294/86.42, 82; 405/158, 165, 166

[56] References Cited

U.S. PATENT DOCUMENTS

| | | | |
|---|---|---|---|
| 2,426,631 | 9/1947 | Mapes | 242/147 R X |
| 3,164,335 | 1/1965 | Dammar | 242/147 R |
| 3,975,919 | 8/1976 | Harrison | 405/166 |

FOREIGN PATENT DOCUMENTS

| | | | |
|---|---|---|---|
| 2748745 | 5/1979 | Fed. Rep. of Germany | 188/65.1 |
| 1593306 | 7/1970 | France. | |
| 2024176 | 8/1970 | France. | |
| 1307252 | 2/1973 | United Kingdom. | |

*Primary Examiner*—Douglas C. Butler
*Attorney, Agent, or Firm*—Hoffman, Wasson & Gitler

[57] ABSTRACT

A device for braking the advance of an elongated element such as a hose or cable, comprising at least an element (13) such as a cable able to be wound spirally around the element (12) to be braked, and having its ends mounted each on a support frame (4,11), and a drive (10) to cause the respective separation of the two frames in a direction parallel to the advance.

16 Claims, 5 Drawing Sheets

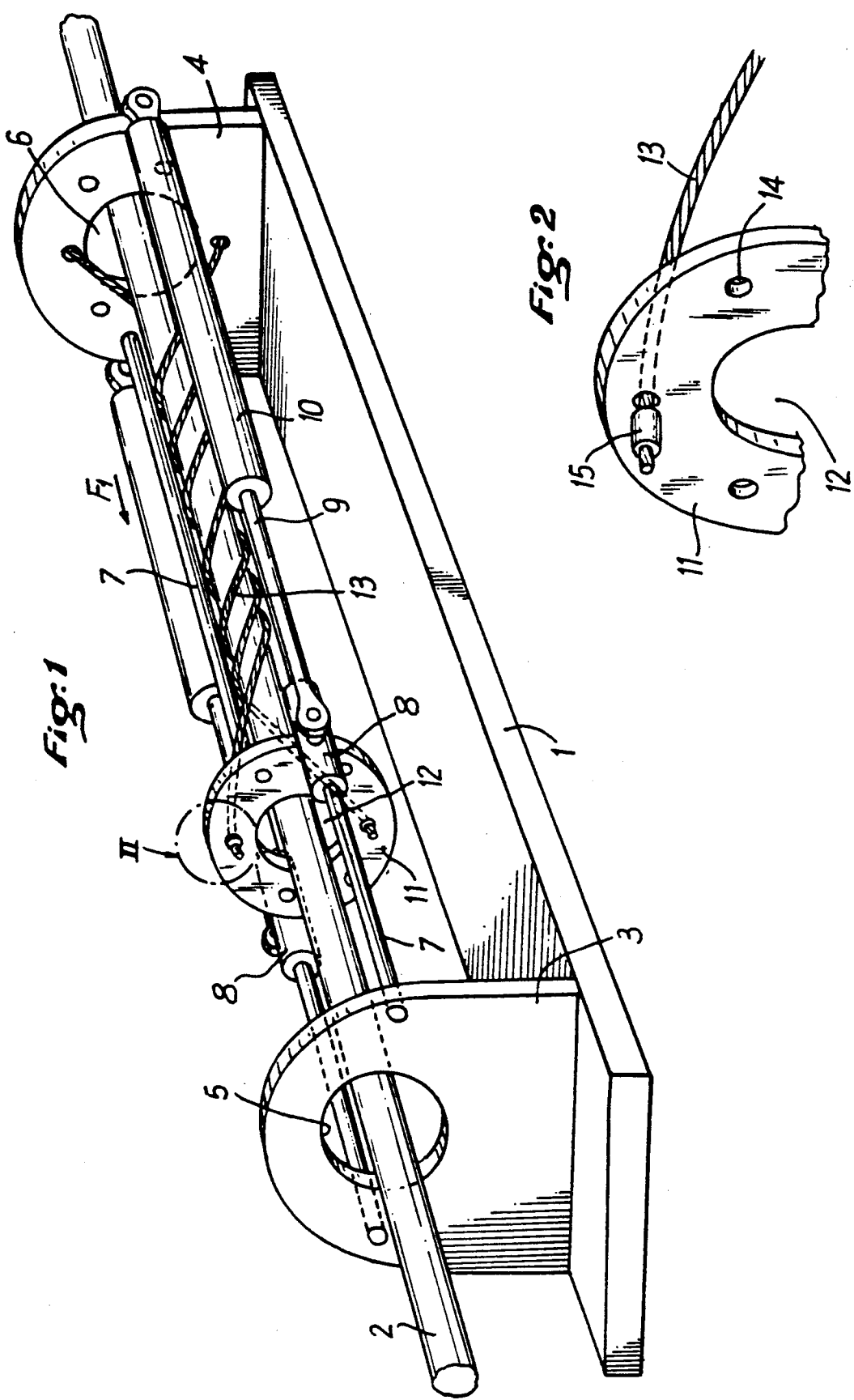

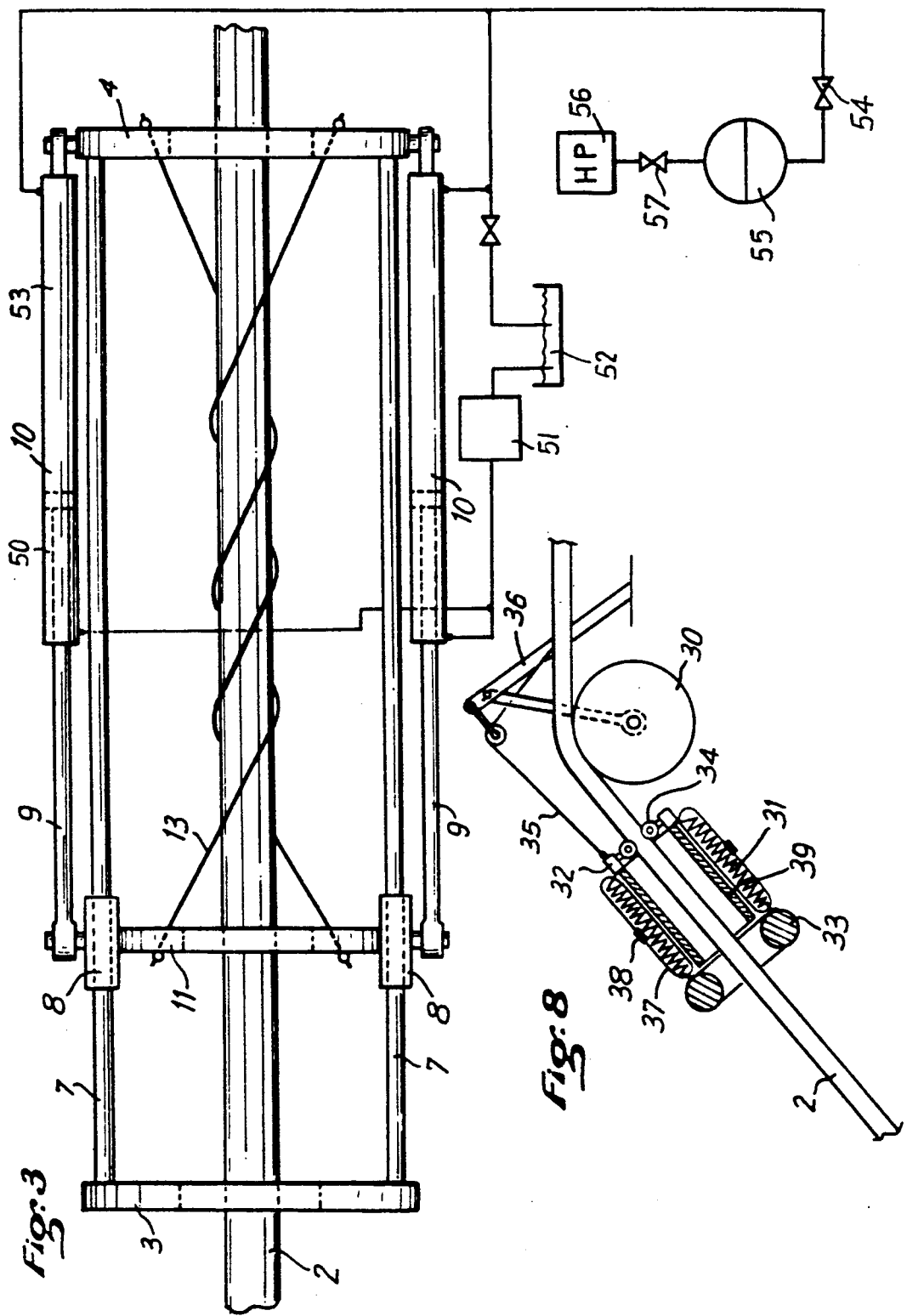

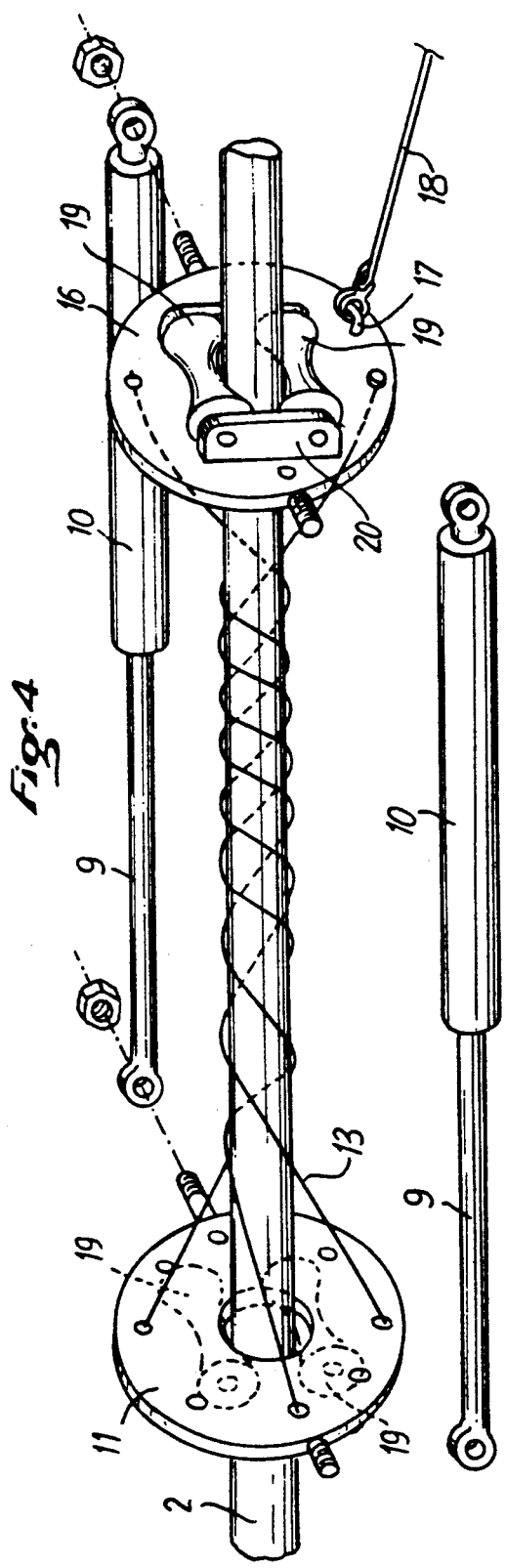
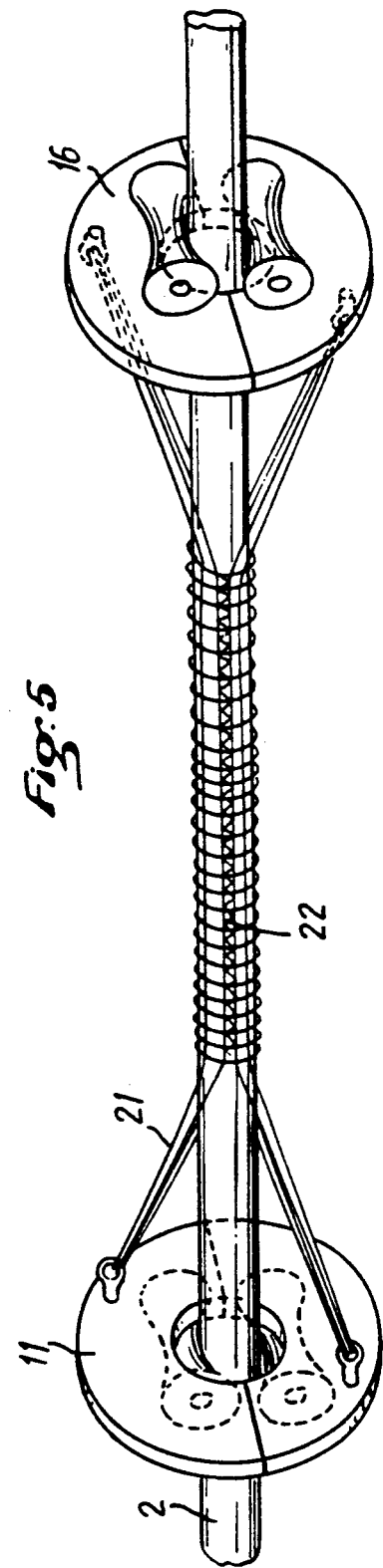

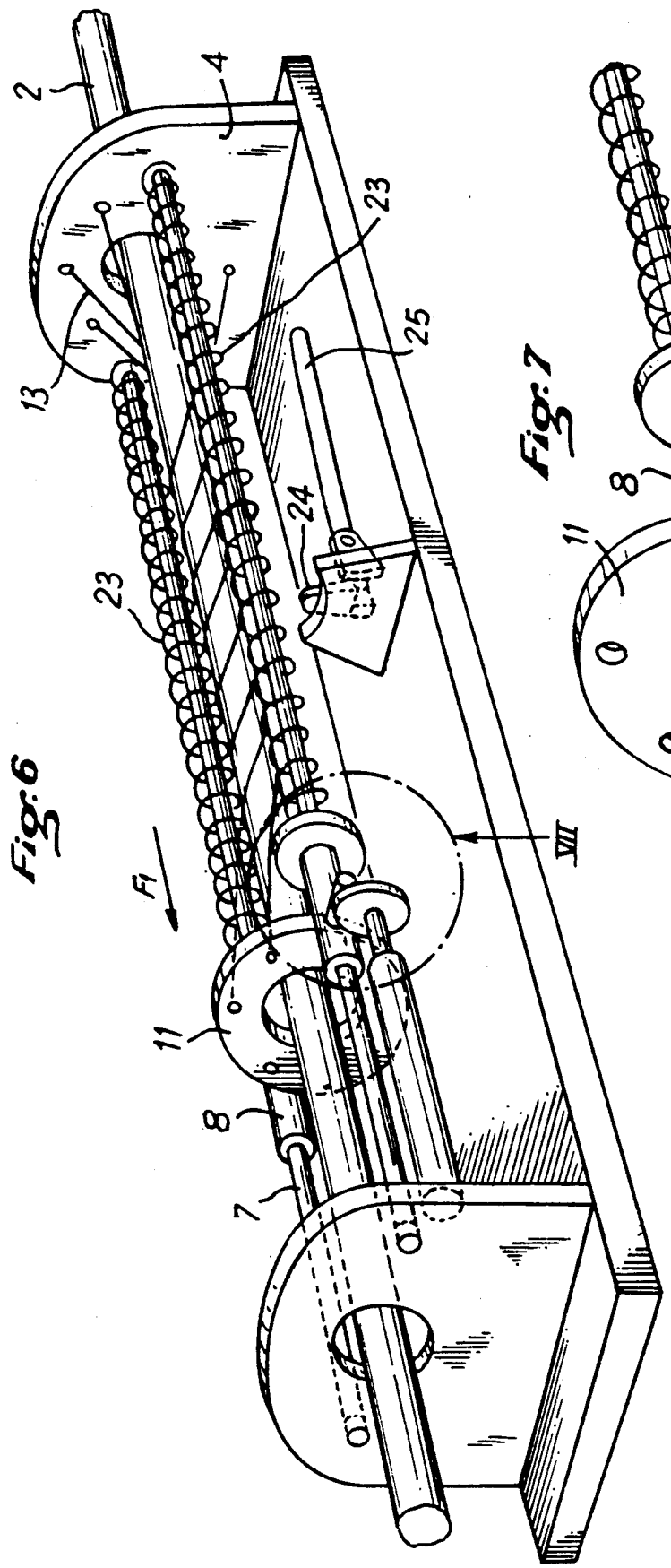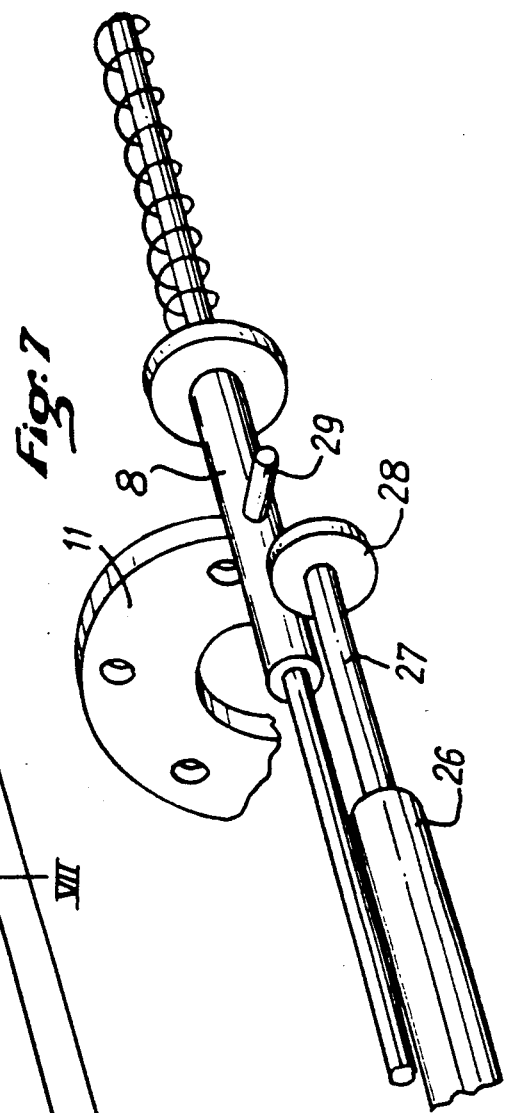

DEVICE FOR BRAKING THE UNWINDING OF AN ELONGATE ELEMENT SUCH AS A HOSE OR CABLE

This application is a continuation of application Ser. No. 939,161, filed on Jan. 20, 1987, now abandoned.

This invention relates to a device for stopping the advance of an elongated element such as a hose or a cable.

The problem of stopping the advance, along their axis, of loads such as pipes or hoses, cables or chains is often encountered when these elements are laid at sea.

This stopping is generally performed with jaw or wedge devices which exhibit the drawback of alloing a certain sliding of the element and, consequently, makring or deforming the surfaces of the element to be braked.

A device making it possible to keep such an element stopped is known by the document U.S. Pat. No. 3,975,919, but this device is unable to stop an advancing element without damaging it.

This invention aims at mitigating these drawbacks by providing a stopping device which has a very rapid operation and which avoids damaging the surface of the stopped element.

For this purpose, the invention has as its object a device for stopping the advance of an elongated element such as a hose or cable comprising at least one element such as a cable that can be wound spirally around the element to be stopped and having its ends mounted each on a support frame, and drive means to cause the respective separation of the two frames in a direction approximately parallel to the advance, characterized by the fact that said drive means comprise at least one energy accumulator able to actuate them.

The spirally wound element can be a cable, but also a chain, a rope, a steel strip performed in a spiral..., the main thing being that its flexibility and its diameter enable it to be wound around the element to be stopped.

To make possible the advance of the elongated element, it is enough to keep the two frames close enough to one another so that the cable is loosely wound around the element. By causing the two frames to separate, a tightening around the elongated element by the cable results.

The energy accumulator exhibits the advantage of causing a very rapid separation of the frames. Actually, it was found that, surprisingly, a stopping without sliding was obtained and, consequently, without damaging the surface of the element to be stopped, provided that at the moment the cable grips this element, the speed of the front part of this cable is on the same order or even greater than that of the element. In other words, the stopping element may be started at a speed of the same order or greater than that of the element to be stopped.

The energy accumulator according to the invention makes it possible to obtain, under practical and acceptable economical conditions, such a speed in a very short time.

In a first embodiment of the invention, said drive means comprise cylinders placed between the two frames to cause their separation, and consequently, the tightening of the cables around the element to be stopped, the energy accumulator comprising at lesat one tank of air under pressure connected to said cylinders.

In another embodiment, said drive means and energy accumulators comprise elastic means such as springs or pneumatic cylinders designed to separate the two frames, a lock being provided to lock the frames in a position where they are close to one another, cylinders being mounted between the frames to bring them close to one another against the action of the eleastic means.

The cylinders can then be smaller than in the preceding embodiment, since they do not cause the stopping force themselves, but only the force that is used to prestress the springs. The lock, which is preferably a lock that can be released very quickly, makes it possible not to leave the cylinders under tension during the advance of the elongated element.

In a third embodiment, the drive means and energy accumulators are constituted by the action of the weight on the downstream frame.

One of said frames can be mounted stationary on a stand on which at least one guide rail is also mounted approximately parallel to the direction of advance, and the other frame is mounted solid with a carriage able to slid on said rail.

In this case, the stand, for example, is mounted in a stationary way on a ship laying submarine cables.

In a variant, at least the downstream frame in the direction of advance can be carried by the element to be stopped, means being provided to hold the upstream frame in the direction of advance.

In this case, at least the downstream part of the device is thus mounted to float on the element to be stopped, which can give more flexibility to its use. Of course, the upstream frame has holding means that make it possible for it to be fastened in a stationary position or in a movable way and not in one selected point.

The upstream frame can be either mounted stationary on a stand or be carried by the element to be stopped.

In this variant, the frame or frames carried by the element to be stopped can be mounted on at least one roller designed to work with said element,.

Thus, the frames are carried by the element to be stopped by this roller or these rollers which provide a quick, but smooth, unwinding of the stopping element, such as a cable.

Said frames are, for example, annular frames through which the element to be stopped passes.

In a particular embodiment of the invention, the device can comprise a plurality of elements such as cables wound in both directions around the element to be stopped.

This arrangement exhibits in particular the advantage that no rotation force is exerted between the two frames.

In another embodiment, the elements such as cables can consist of a holding sleeve (an element also known under the name "chinese finger").

A pad can be mounted on the upstream frame and placed between the element to be braked and the element such as a cable, to take up a portion of the forces exerted on this element.

So that the stopping force is properly produced, either said pad possesses a length less than the length of the stopping element, or else the pad is made of at least two parts that are longitudinally spaced and connected by an elastic element.

When the element to be stopped has a noncircular section, pads having a section complementary to that of the element are preferably provided, so as not to deform the latter.

A flexible material can be inserted between the spirally wound element and the element to be stopped to increase the stopping force and to limit wear.

Figure 10:
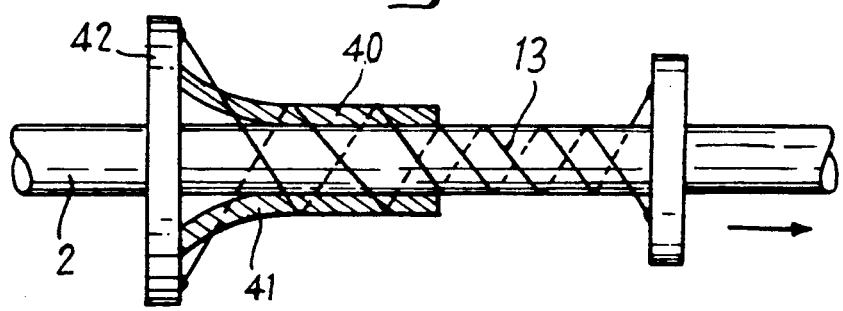
Figure 11:
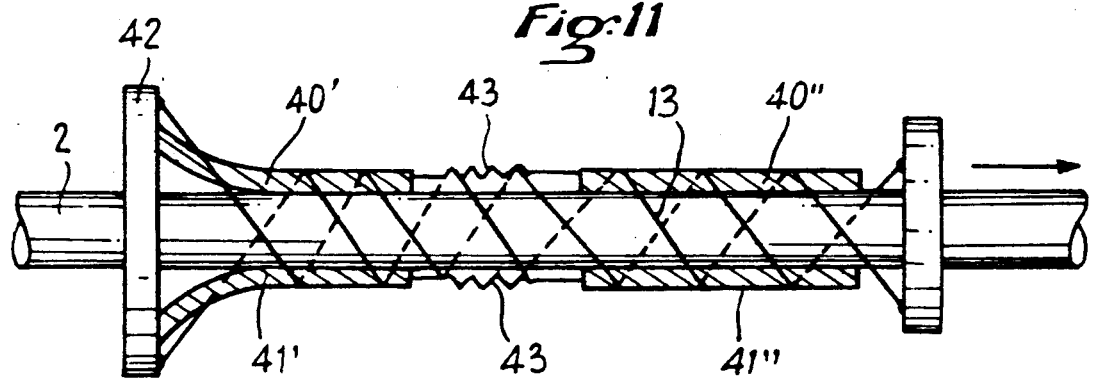

Now, several embodiments of the invention will be described by way of nonlimiting examples with reference to the accompanying diagrammatic drawings in which:

FIG. 1 is a view in perspective of a first embodiment of the invention, in which the energy accumulator has been ommited for greater clarity, FIG. 2 is a view on a larger scale of detail II of FIG. 1, FIG. 3 is a view from above of the device of FIG. 1, FIG. 4 is an exploded view in perspective of a second embodiment, FIG. 5 is a view in perspective of a third embodiment in which the drive means have been omitted, FIG. 6 is a view in perspective of a fourth embodiment, FIG. 7 is a view on a larger scale of detail VII of FIG. 6, FIG. 8 is a side view representing another embodiment, FIG. 9 is a view in section, perpendicular to the element to be stopped, of another embodiment, FIG. 10 is a very diagrammatic top view of another embodiment, and FIG. 11 represents a variant of the device of FIG. 10.

The device of FIGS. 1 to 3 is mounted on a stand 1 (not shown in FIG. 3) extending in direction of advance F1 of elongated element 2. This stand carries a fitting 3 at its downstream end and a fitting 4 at its upstream end, each provided with an opening 5 and 6, respectively, through which element 2 passes. Fittings 3 and 4 are placed perpendicular to stand 1 and to direction F1.

Two rods 7 are placed between fittings 3 and 4 parallel to direction F1 and act as rails for carriages 8 appearing in the form of sleeves sliding on rods 7. Sleeves 8 are connected to rods 9 of two cylinders 10 mounted on fitting 4 to move these sleeves along rods 7.

Furthermore, the two sleeves 8 carry, between rods 7, an annular frame 11 exhibiting a central orifice 12 through which element 2 also passes and on which the first ends of cable 13 are mounted in holes 14 and held by sleeves 15.

The other ends of cables 13 are held, for example in the same way, or else in a removable way, on fitting 4 which thus acts as a second stationary frame. On the side of these other ends, elastic elements can be provided between the stops of cables 13 and fitting 4.

In FIGS. 1 to 3, only two of cables 13 are shown wound in the same direction around element 2. In fact, the number of cables to be used depends on the stopping force that is desired to be obtained. The different cables can all be wound in the same direction or in both directions, which exhibits the advantage in this latter case of canceling the relative forces of rotation between frame 11 and frame 4.

Chambers 50 of cylinders 10, located on the side of rods 9, are connected to a pump 51 to supply them with hydraulic fluid coming from reservoir 52.

The other chamber 53 of the cylinders is connected by a quick opening valve 54 to a hydropneumatic tank 55. Pressurizing tank 55 is performed from a high pressure gas bottle 56 by a valve 57.

Control of the filling of the hydraulic circuit is performed from reserve 52 by a valve.

To enable element 2 to advance, it is enough to bring frame 11 close enough to frame 4, using pump 51 and cylinders 10, so taht cables 13 loosely encircle elements 2. Thus the air contained in tank 55 is compressed, which has the effect of storing energy. To obtain the stopping of the advance, frame 11 is quickly moved in the direction of arrow F1 using cylinders 10 by opening valve 54. Thus a tightening around element 2 by cables 13 and, consequently, a stopping of this element is achieved. The pressure in tank 55 determines, on the one hand, the speed at which frame 11 is thrown apart from frame 4, and, on the other hand, the residual force being exerted on the downstream end of cables 13 after stopping.

Said speed may be on the same order or greater than the speed of advance of the element 2 so as to avoid damaging the latter by cables 13. The residual force being exerted on the downstream end of the latter must be sufficient, as a function of the pulling force exerted by element 2, to hold the latter after it is stopped.

The energy accumulator consisting of tank 55, consequently makes possible not only the static hold of element 2 when the latter is stopped but also a dynamic operation making possible the stopping of element 2 during advance thanks to a sufficient speed of separation between frames 4 and 11.

In the other embodiments shown in FIGS. 4 to 7, similar elements have received the same references.

In the embodiment shown in FIG. 4, stand 1, fitting 3 as well as tubes 7 and their sleeve have been eliminated. The hydraulic circuit has been kept, but not shown.

Rods 9 of cylinders 10 are then mounted on downstream frame 11 while the bodies of cylinders 10 are mounted on an upstream frame 16 similar to frame 11. However, frame 16 comprises means 17, for example a ring, making it possible to fasten it to a holding means 18, itself connected to any stationary structure.

Frames 11 and 16 now each comprise two dolly-shaped rollers 19 mounted on both sides of the central opening of frames 11 and 12 on flanges 20 fastened to these frames.

The device is, therefore, in this case, entirely mounted to float on the element 2 to be braked by frames 11 and 16 themselves carried on element 2 by rollers 19.

As a variant, the device could be mounted only partially floating, upstream frame 16 being fastened to a stand such as frame 4 of FIG. 1, and downstream frame 11 being carried by element 2.

The operation of the device is the same as that described before with reference to FIGS. 1 to 3, i.e., frames 11 and 16 are brought together by actuation of pump 51 to make possible the advance of element 2, and are separated with cylinders 10 by opening of valve 54 to obtain the stopping.

The device shown in FIG. 5 is identical with FIG. 4 (the cylinders and the hydraulic circuit have not been shown) except that cables 13 have been replaced by a holding sleeve 21 made in a known way in the form of a cloth of woven threads, folded over itself and sewn with a seam 22.

In this embodiment, frames 11 and 16 are preferably made in the form of half-disks assembled by any suitable means for facilitating the installation of the device on element 2.

The device of FIG. 5 operates in a manner identical with that of FIG. 4.

The device of FIGS. 6 and 7 is similar to that of FIGS. 1 to 3 but cylinders 10, in this embodiment, are replaced by compression springs 23 placed on tubes 7 between mobile frame 11 and stationary frame 4 to cause the separation of the mobile frame in relation to the stationary frame.

A lock 24 able to be controlled by a control rod 25 makes it possible to lock mobile frame 11 in its position close to stationary frame 4, in which cables 13 do not exert any stopping forces on element 2.

Cylinders 26 are mounted on fitting 3 and have at the end of their rod 27, a pusher 28 able to work with a pin 29 mounted on sleeve 8, to push mobile frame 11 back in the direction opposite the direction of advance F1, so as to bring mobile frame 11 into the position where it is locked with lock 24.

Once mobile frame 11 is locked, rods 27 are retracted into cylinders 26 and element 2 can freely advance. If needed, a control action is exerted on rod 25, which has the effect of unlocking lock 24, so that springs 23 propel frame 11 in direction of advance F1 at a speed of the same order of magnitude as the speed of advance, which causes a tightening of cables 13 around element 2 and stops the latter.

Here, therefore, the spring acts as a driver and at the same time as an energy accumulator, cylinders 26 playing a role equivalent to that of pump 51 in the embodiment of FIG. 1.

In the embodiment in FIG. 8, element 2 is unwound, for example from a ship, and passes over a drum 30.

A holding sleeve 31 is mounted at its upstream end on a frame 32 and at its downstream end to a frame 33.

The upstream frame is provided with rollers 34 similar to those described with reference to FIG. 4, and connected to the ship by a cable 35 connected to a support structure 36.

Holding sleeve 31 is compressed on itself in the longitudinal direction (or folded in zigzags as shown in FIG. 8), and held in this configuration by the fact that cables 37 forming loops able to be very quickly detached, for example with explosive bolts 38, keep the upstream and downstream frames connected. The holding sleeve thus folded is engaged around a rigid sleeve 39 solid with frame 33 and designed so that it prevents the holding sleeve from coming into contact with element 2 in normal operation.

When the need is felt, cables 37 are released so that holding sleeve 31 expands under effect of the action of the weight which carries frame 33 and sleeve 39 at high speed downstream. Thus, the holding sleeve by unwinding itself tightens around element 2 and causes the stopping of the latter.

Like the springs in the preceding case, frame 33 and sleeve 39 act both as driver and energy accumulator, here potential energy from gravitational pull.

As a variant, holding sleeve 31 can be replaced by two layers of cables wound in opposite directions. In this case, each layer can be placed on a sleeve, the sleeves being concentrically placed.

In the embodiment shown in FIG. 9, two pads 40 and 41 are inserted between element 2 and cables 13.

Element 2 here has an elliptical section and pads 40 and 41 have a shape such that the unit consisting of element 2 and the pads possesses an approximately circular section. Thus, during tightening of cable 13, a squashing or buckling of element 2 in the direction of its main axis is avoided.

In FIG. 10, pads 40 and 41 are shown fastened to upstream frame 42, but of lesser length than cables 13, in its extended position shown in the figure. Consequently, the downstream portion of cables 13 is in contact with element 2 and can thus provide the tension of these cables. On the other hand, the main stopping force, which occurs in the upstream portion of cables 13, is taken up by pads 40 and 41 which transmit it to frame 42, thus lightening the stresses exerted on cables 13.

It is also possible to use pads 40', 40" and 41', 41" having approximately the same length as cables 13 once extended, but then these pads are made of two parts connected in the longitudinal direction by elastic means 43. Under these conditions, pads 40' and 41' assure the putting of the device under tension whereas pads 40" and 41" assure the transmission of the stopping force to upstream frame 42.

Different variants and modifications can, of course, be made to the various devices described above without thereby going outside the scope or the spirit of the invention.

I claim:

1. A device for stopping an elongated element such as a hose or cable moving lengthwise in a predetermined direction at a given initial speed with respect to a supporting structure, comprising at least one flexible tensioning member arranged in a helical path around said elongated element, a first frame fixed with respect to said structure supporting a first end of said flexible tensioning member, a second frame supporting a second end of said flexible tensioning member, said second frame being movable away from said first frame in the direction of movement of said elongated element, and means for driving said second frame away from said first frame in said predetermined direction at a speed at least equal to said initial speed of the elongated element, thereby to tighten said flexible tensioning member around said elongated element to stop the same without creating slippage between the elongated element and said tensioning member, said driving means comprising an energy accumulator for rapidly driving said second frame away from said first frame.

2. A device according to claim 1, wherein said driving means comprise at least one cylinder placed between the two frames, the energy accumulator comprising at least one reservoir of pressurized air joined to said cylinder.

3. A device according to claim 1, wherein said driving means comprises elastic means for separating the two frames, and at least one cylinder mounted between the frames to draw them together against the action of said elastic means.

4. A device according to claim 1, wherein said direction of movement of the elongated member is downward, and said second frame moves solely under the influence of gravity.

5. A device according to claim 1, further comprising at least one guide rail mounted on said structure, and a carriage slidably mounted on said rail, and said second frame being affixed to said carriage.

6. A device according to claim 1, wherein the second frame is carried by the elongated element.

7. A device according to claim 6, wherein said second frame is supported by at least one roller adjusted to cooperate with said elongated element.

8. A device according to claim 1, wherein said first and second frames are annular frames through which said elongated element passes.

9. A device according to claim 1, comprising a plurality of tensioning elements wound helically around the elongated element in opposite helical directions.

10. A device according to claim 9, wherein the flexible tensioning elements form a holding sleeve.

11. A device according to claim 10, further comprising a sleeve of flexible material placed between the flexible tensioning member and said elongated element.

12. A device according to claim 1, wherein said frames comprise at least two separable parts.

13. A device according to claim 1, further comprising at least one brake shoe mounted on the structure and placed between the elongated element and the flexible tensioning member.

14. A device according to claim 13, wherein said brake shoe has a length shorter than that of said flexible tensioning member once said brake shoe is deployed.

15. A device according to claim 13, wherein said shoe comprises at least two parts longitudinally spaced apart and interconnected by an elastic element.

16. A device according to claim 13, wherein said shoe has a transverse cross-section complementary to that of the elongated element.

* * * * *